United States Patent
Hicks et al.

(10) Patent No.: US 10,846,464 B2
(45) Date of Patent: Nov. 24, 2020

(54) SYSTEMS AND METHODS FOR CAPTURING REAL TIME CLIENT SIDE DATA AND FOR GENERATING A PERMANENT RECORD

(71) Applicants: Bill Hicks, Fort Lauderdale, FL (US); Dave Liscum, Lighthouse Point, FL (US); Jason Napsky, Ridgeland, MS (US)

(72) Inventors: Bill Hicks, Fort Lauderdale, FL (US); Dave Liscum, Lighthouse Point, FL (US); Jason Napsky, Ridgeland, MS (US)

(*) Notice: Subject to any disclaimer, the term of this patent is extended or adjusted under 35 U.S.C. 154(b) by 23 days.

(21) Appl. No.: 16/218,265

(22) Filed: Dec. 12, 2018

(65) Prior Publication Data

US 2019/0377782 A1    Dec. 12, 2019

Related U.S. Application Data

(63) Continuation of application No. 15/599,287, filed on May 18, 2017, now abandoned, which is a continuation of application No. 13/605,095, filed on Sep. 6, 2012, now abandoned, application No. 16/218,265, filed on Dec. 12, 2018, which is a
(Continued)

(51) Int. Cl.
G06F 17/00    (2019.01)
G06F 40/146   (2020.01)
G06F 21/32    (2013.01)
G06F 9/451    (2018.01)

(52) U.S. Cl.
CPC .......... *G06F 40/146* (2020.01); *G06F 9/451* (2018.02); *G06F 21/32* (2013.01)

(58) Field of Classification Search
CPC ......... G06F 40/146; G06F 9/451; G06F 21/32
See application file for complete search history.

(56) References Cited

U.S. PATENT DOCUMENTS

| 5,903,721 A * | 5/1999 | Sixtus | G06Q 20/02 |
| | | | 726/2 |
| 6,105,012 A * | 8/2000 | Chang | G06Q 20/00 |
| | | | 380/277 |

(Continued)

FOREIGN PATENT DOCUMENTS

WO    WO-2004070617 A1 *    8/2004    ........... G06F 3/1285

*Primary Examiner* — Laurie A Ries
(74) *Attorney, Agent, or Firm* — Olivo IP Law Group, P.C.; John W. Olivo, Jr.

(57) ABSTRACT

A system is provided for generating a permanent record for an, e.g., online transaction. The system includes a computer interface module which records movement of a cursor on a computer screen and outputs the recorded data. A signature generation module which receives the recorded data and generates a graphical image based upon the recorded data. A webpage reading module reads the webpage and the data input by a user and outputs the combined content and data to a rendering process, which renders a permanent computer record file that includes an image capture of the transaction (content and data) along with, optionally, the signature. According to the present invention, a record can be created that includes the exact content and other information presented to a party to an online transaction along with a signature of that party.

16 Claims, 14 Drawing Sheets

Related U.S. Application Data continuation-in-part of application No. 13/073,819, filed on Mar. 28, 2011, now Pat. No. 8,588,483, which is a continuation of application No. 11/312,397, filed on Dec. 21, 2005, now Pat. No. 7,916,906, which is a continuation-in-part of application No. 11/205,002, filed on Aug. 17, 2005, now abandoned.

(60) Provisional application No. 61/635,014, filed on Apr. 18, 2012, provisional application No. 60/593,210, filed on Dec. 21, 2004.

(56) References Cited

U.S. PATENT DOCUMENTS

| | | | | |
|---|---|---|---|---|
| 6,307,955 B1* | 10/2001 | Zank | | G06K 9/00154 380/30 |
| 6,848,613 B2* | 2/2005 | Nielsen | | G06Q 20/04 235/379 |
| 6,988,241 B1* | 1/2006 | Guttman | | G06F 40/18 715/220 |
| 7,533,268 B1* | 5/2009 | Catorcini | | H04L 9/3247 713/168 |
| 7,869,634 B2* | 1/2011 | McOwan | | G07C 9/35 382/119 |
| 2001/0056411 A1* | 12/2001 | Lindskog | | G06Q 10/0875 705/76 |
| 2002/0042885 A1* | 4/2002 | Eskandarian | | G06F 21/32 726/6 |
| 2002/0082929 A1* | 6/2002 | Wang | | G06Q 20/04 705/27.1 |
| 2003/0135740 A1* | 7/2003 | Talmor | | G06F 21/32 713/186 |
| 2003/0168509 A1* | 9/2003 | Nielsen | | G06Q 20/04 235/379 |
| 2004/0015451 A1* | 1/2004 | Sahota | | G06Q 20/20 705/71 |
| 2004/0217884 A1* | 11/2004 | Samadani | | G01C 7/00 340/995.14 |
| 2005/0063570 A1* | 3/2005 | Kim | | G07C 9/247 382/119 |
| 2005/0216771 A1* | 9/2005 | Malcolm | | G06F 21/606 726/5 |
| 2005/0223234 A1* | 10/2005 | McOwan | | G06K 9/00154 713/186 |
| 2009/0049534 A1* | 2/2009 | Chung | | G06Q 10/10 726/7 |

\* cited by examiner

Automatic Debit Information

| | |
|---:|---|
| *Amount of Initial Payment: | |
| *Date of Initial Payment to be made: | |
| *Day of all recurring payments: | |
| *Monthly fee amount to be debited: | |
| *Bank Name: | |
| *Name of Account Holder: | |
| *Account Holder Address: | |
| *City, State, Zip: | |
| *Routing Number: | |
| *Account Number: | |
| *Account Holder Phone Number: | |
| *Last 4 digits of Social Security Number: | |
| *Checking or Savings?: | |
| *Your Email Address: | |

⎫ 302

Enter your Name and Email address, sign your name in the space below with your mouse, and click Validate Your Name: ☐
Email Address: ☐ ~202

X _____

104 ~ [ Clear ]   [ Validate ] ~ 106 www.SignatureLink.com™ Copyright 2004 SignatureLink, Inc., patent pending

~ 102

[ Submit ] ~ 304

FIG. 3

This is an example of the resulting signature.gif file displayed at the bottom of a contract on the signup Thank you page.

- Company will report any outstanding balances to the three main credit bureaus.

- Company will have the incident reported to anti-fraud databases, which will prevent any further purchases on the Internet.

- Company has a chargeback legal department and WILL file suit immediately, if necessary.

Terms & Conditions are subject to change.

FIG. 5

Enter your Name and Email address, sign your name in the space below with your mouse, and click Validate Your Name: 
Email Address: ~202
Last 4 digits of SSN:

X _____

104 ~ [ Clear ]      [ Validate ] ~106 www.SignatureLink.com™ Copyright 2004 SignatureLink, Inc., patent pending

Render PDF Process – January 2012

SYSTEMS AND METHODS FOR CAPTURING REAL TIME CLIENT SIDE DATA AND FOR GENERATING A PERMANENT RECORD

PRIORITY CLAIMS

This application is a continuation of U.S. patent application Ser. No. 15/599,287, filed on May 18, 2017, which is a continuation of U.S. patent application Ser. No. 13/605,095, filed on Sep. 6, 2012, which claims priority to U.S. Provisional Application No. 61/635,014 filed on Apr. 18, 2012, the entire contents of which is hereby incorporated by reference. This application is also a Continuation-In-Part application of and claims priority to U.S. application Ser. No. 13/073,819, filed on Mar. 28, 2011, now U.S. Pat. No. 8,588,483, which is a Continuation of and claims priority to U.S. application Ser. No. 11/312,397, filed on Dec. 21, 2005, now U.S. Pat. No. 7,916,906, which is a Continuation-In-Part application of and claims priority to U.S. application Ser. No. 11/205,002 filed on Aug. 17, 2005, and claims priority to U.S. Provisional Application No. 60/593,210 filed on Dec. 21, 2004; the entire contents of each of which are hereby incorporated by reference.

BACKGROUND OF THE INVENTION

Field of the Invention

The present invention relates generally to systems and methods for capturing real-time client-side data. Other aspects of the invention relate to merging the captured data with an online biometric signature. Other aspects of the invention relate to generating a permanent record based on the captured data and/or the online biometric signature.

Description of the Related Art

Since the outset of the Internet, electronic commerce has proliferated dramatically. It is now common place to transact all types business over the Internet. Retail sales have benefited from the Internet, and now most merchants have web sites that allow online purchasing via a website or online catalogue. All that is needed to complete a purchase is access to the Internet and a credit card.

Online merchants are handicapped by the lack of a written contract signed by its customers. If an online purchaser disputes a credit card transaction, the merchant will not have a signed contract to prove the legitimacy of the transaction. As a result, online vendors are exposed to undue risk.

Further, customers entered valuable information in connection with online transactions that is difficult to capture due to the nature of existing e-commerce solutions. Such client-side data is useful for proving the terms and conditions of the corresponding online transaction.

There is a need for systems and methods for client-side data in connection with online transactions and for generating permanent records based on the captured information. Such permanent records can be more useful if the generated record also includes a captured customer signature along with the terms and conditions associated with the corresponding online transaction.

SUMMARY OF THE INVENTION

According to an embodiment of the present invention, a system is provided for generating a permanent record for an, e.g., online transaction. The system may include a signature module, a screen scrape module, and a rendering module. The signature module includes a computer interface module which records movement of a cursor on a computer screen and outputs the recorded data; and a signature generation module which receives the recorded data and generates a graphical image based upon the recorded data. The screen scrape module reads the webpage and the data input by a user and outputs the combined content and data to the rendering module, which renders a permanent computer record file that includes an image capture of the transaction (content and data) along with, optionally, the signature. Therefore, a record can be created that includes the exact content and other information presented to a party to an online transaction along with a signature of that party.

The screen scrape module is preferably configured to "walk" the DOM of an HTML page and to insert into the HTML the data that has been input by the user to therefore, output a combination of the actual content and data that is part of the user experience.

The rendering process preferably generates a non-editable file, such as, e.g., PDF.

According to aspects of the present invention, the screen scrape module may be stand alone.

According to aspects of the present invention, the screen scrape and rendering modules may be combined to form a stand-alone application.

According to aspects of the present invention, remote storage and security can be provided so as to securely record online transaction used for validation of the corresponding transaction.

Further applications and advantages of various embodiments of the present invention are discussed below with reference to the drawing figures.

BRIEF DESCRIPTION OF THE DRAWINGS

FIG. 3 is a view of a signature block including additional form fields according to another embodiment of the present invention.

FIG. 5 is a screen shot of a signature image generated according to an embodiment of the present invention.

FIG. 7 is a view of a signature block including additional form fields according to another embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

SIGNATURE LINK®, invented a program, application, module, component or the like that displays a signature pad on a computer screen (e.g., within a web browser window) and captures signatures input via a mouse or other peripheral device (e.g., writing pad, keyboard arrows, touch pad, etc.). The signature pad can be a stand-alone Macromedia Flash program, but could be programmed in other languages such as, but not limited to, JavaScript, ActiveX, MS Sparkle, MS .Net, MS Longhorn, Vista, etc. The signature pad may be executed by a hosting application (e.g., web browser) or the like and can be called from any application, such as from an HTML, XML, or XAML page, or may be a browser plug-in. Features of the signature pad are described in co-owned U.S. Pat. No. 7,916,906 which has already been incorporated herein by reference.

Preferably, the signature pad is configured to capture a raw signature (i.e., biometric signature) and generate a graphical image thereof. The signature pad preferably stores captured signature data securely (in a read only format), such as locally in a file, database, etc. for further viewing of the signature, generate a graphic image file of the signature, or transmit the signature data (e.g., as a character string) to a remote server for secure storage, creation of a graphic image file, or for viewing. The signature data may be captured as coordinate or pixel data, or coordinate or line data (e.g., beginning and end points, line length, and angle degrees, etc.).

By making the signature pad a stand-alone application, such as a Flash program, the signature may be captured on its own, without submitting an accompanying HTML form or the like. The signature pad may be further configured to notify a site or server (e.g., a merchant web server) when the signature has been properly captured and optionally, whether the signature is verified against a signature on file. Additional information may be captured along with the signature.

Figure 1:
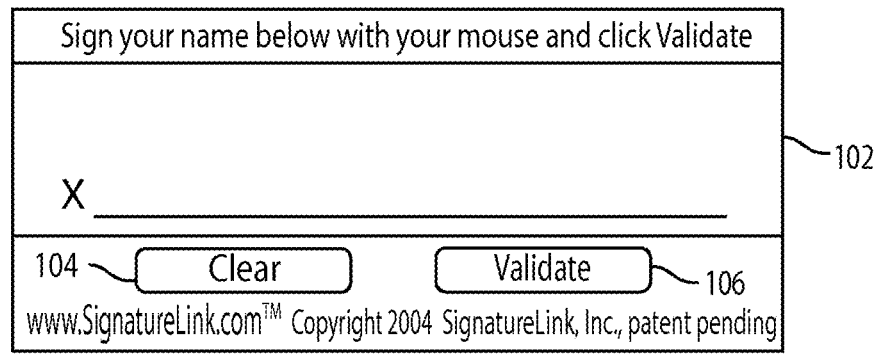
FIG. 1 is view of a signature block according to an embodiment of the present invention.

FIG. 1 shows an exemplary embodiment of the present invention. A signature block (signature pad/box) 102 can be displayed on a computer screen, such as within a web browser window. The signature block 102 is preferably generated by a Flash or MS Sparkle program and can be part of a larger form object 100 that can include text, graphics or fields for other data entry.

The signature pad 102 may be displayed on the computer screen in any shape (e.g., rectangle-shaped) and is configured to allow the computer user to draw, for example, to sign their full name, nickname, or initials. For aesthetic reasons, it may be preferable to include a signature block that is sized to match a corresponding form or web page. The signature pad 102 may appear, for example, on an Internet shopping cart or web form. The preferred functions of the signature pad are Draw: to write the signature, Clear: to erase a signature ("Clear" button 104) and Submit or Validate: to send, submit, store or validate the signature ("Validate" button 106). In some embodiments, the signature pad 102 may additionally or alternatively define the background color of the displayed signature pad and/or the color of the raster (e.g., pen) and/or fill the displayed signature block with a predefined background.

The signature pad 102 may be configured to capture the coordinates input from a peripheral device, such as a mouse or other pointing device. The capture process preferably outputs x and y coordinates of the location of the windows cursor within the signature pad 102. The captured coordinates may then be used to create a graphical image of the raw signature (i.e., biometrically accurate signature). The coordinates or the graphical image file or both could be stored for later use. Preferably, the signature data is stored as line data, e.g., beginning and end points, line length and angle degrees. Stored signature data is preferably secure and could be used to generate a graphic image file (gif) or other image file (e.g., .bmp, .jpg, tif, etc.), when completed. However, in some embodiments, the signature pad 102 may acquire the signature data and/or graphical image of a raw signature using camera, such as, for example, a digital camera. In one non-limiting embodiment, the digital camera may be coupled to or integrated in a cell-phone or mobile device.

In some embodiments, the signature pad 102 may alternatively or additionally capture dynamic characteristics of a signature, such as, for example, (i) the size and shape of the entire signature, (ii) the number of strokes in the signature, (iii) the order or sequence of strokes of the signature, (iv) the number of closed loops of the signature, (v) the distance or length of strokes of the signature, (vi) tangents and derivatives of segments and/or points of the signature, (vii) the velocity or speed of segments and/or an entire signature, and derivatives thereof, and/or (viii) the pressure applied in making the strokes of the signature (if a pressure-sensitive signature pad is employed).

In some embodiments, the signature pad 102 may alternatively or additionally capture the date and time (e.g., at millisecond intervals) that each point or pixel of a signature was captured. In one non-limiting embodiment, the signature pad 102 may set the rate at which the timing of points or pixels are captured at a predetermined rate (e.g., within a range of 40-120 samples/second), and the rate may be determined by, for example, the processing speed and/or sampling rate of the client computer 408.

Preferably, signatures are displayed within signature pad 102 while the user is entering the signature. For example, the signature pad 102 could be configured to use a computer mouse input to generate a signature. When the left mouse button (not shown) is depressed, and the windows cursor is within the signature pad 102, the coordinates of the mouse cursor can be captured by signature pad 102 and simultaneously displayed therein to the user via a program display function (e.g., Flash line LINETO command), so that the user can see the signature as it is being written. Captured signatures, signature data, graphical objects, etc. may be accessed by any means, such as online through a web page or link. In some embodiments, in addition to a handwritten signature captured by the signature pad 102 as it is written, the captured signature may alternatively be stored signatures previously captured by the signature pad 102, imported/ uploaded images of a handwritten signature, and/or a cursive font typed into the displayed signature pad 102 or previously captured.

Preferably, the graphical image of the biometric signature and/or the raw signature data is transmitted to a remote server for storing. The image or signature data is preferably stored in a file format and can be assigned an URL address for convenient access. As mentioned above, the signature may be captured and stored independent of any other application. Therefore, if the signature is captured in connection with a merchant web site or the like, the present invention may be configured to notify the merchant when the signature has been submitted, if there is an error, and even whether the signature is verified, such as against a stored signature. For example, the signature pad 102 or remote server (see FIG. 4) may be configured to provide the URL of the stored signature to the merchant or party requesting the signature data. Files are preferably stored with advanced encryption methods for security. However, some embodiments may not store the received biometric signature and/or raw signature data.

Figure 2:
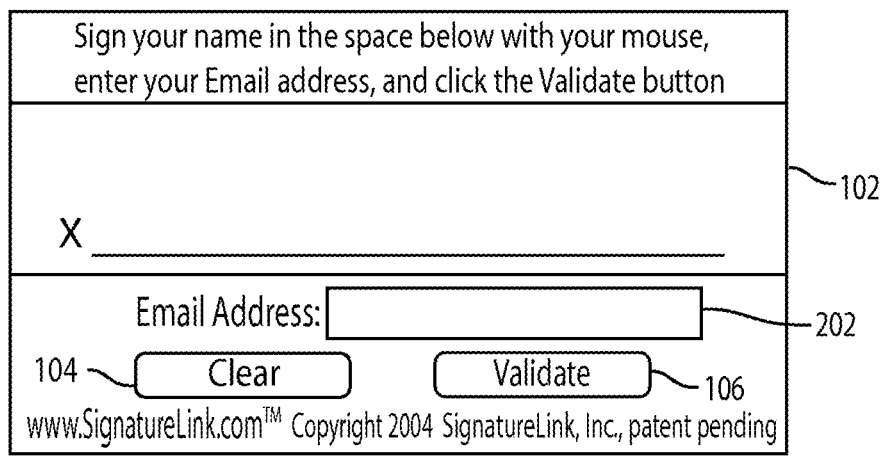
FIG. 2 is a view of a signature block including an email address form field, according to another embodiment of the present invention.

The signature coordinates or graphic image may be submitted and/or stored along with any additional accompanying data, which could be used to identify the signature or signer. For example, as shown in FIG. 2, a form field to enter the Email Address could be included in a separate block 202. Any data, including such client-side data, could be stored or captured with a signature. For example, one or more of the following: a Client ID, Customer ID, an IP address, a Session ID, an email address, and Company ID, SSN, EIN, SIN, etc. See also FIG. 7. This additional data may be supplied by the signer by typing the information into form fields (on the signature pad itself or in the hosting application, such as the web browser HTML code), or it may be embedded in HTML or code or a client program used to host or display the signature pad 102. If required data is missing or invalid, the signature capture process could be configured to display an appropriate error message to the user in the form of a dialog box, web page, etc.

Another example is shown in FIG. 3. An HTML form 300 includes fields 302 for entry of City, Location, Zip, Phone, 800 #, and Fax number. The drawing pad 102 has a Submit button 304 below it. If the Submit button 304 is depressed before all the fields are filled in or before the signature is drawn, an error message could be generated. Alternatively, the signature can be submitted irrespective of whether all the HTML form fields 302 have been filled in and the HTML form can be submitted separately.

Note that the signature pad can operate independent from an HTML page. Further, the present invention is not limited to integration with an HTML page and the functionality of the signature pad 102 can be integrated with other programs, such as XML, XAML, MS Sparkle, MS .Net, etc.

When additional data is supplied, the data could be captured with the signature or in a separate file which is later merged with the signature. In the alternative or in addition thereto, it may be stored, for example in a database, to aid in future lookup of the captured signature. The signature and its accompanying data could be submitted independently from the hosting application form. If it is submitted to the server with the form, the server may redirect or download a web page to the client. If it is submitted independently, the hosting application or the signature capture program may display a message, such as a dialog box, to the user and/or redirect the user when the signature has been successfully received by the server or if there is an error.

The signature or drawing can be captured on the client side, for example, with program executed on the client PC, for example, by a web browser. The program could comprise written instructions in any computer programming language having the appropriate capabilities, but is preferably designed specifically for online (e.g., Web) applications, such as HTML, XAML, Flash, JavaScript, MS Sparkle, MS .Net, MS Longhorn, Vista, etc. The program can be configured to record x and y coordinates of the signature, which may be used for viewing, secure storage or editing, and/or send the signature data in the form of pixel data, or coordinate or line data (e.g., begin and end points, line length, and angle degrees, etc.), to a server for viewing/editing/storage. An image generation program or module may use the coordinates to create the signature or drawing as a graphic image, which can be stored as a file on a file system, possibly for access online or in a database.

One skilled in the art will understand that the signature capture and image generation processes could be combined and implemented by a single computer program or by several separate components residing together or remote from each other. For example, a Flash program could be downloaded (e.g., with or from an HTML page) to capture the signature data and send the data to a remotely located program, which generates the image of the signature.

The signature may be submitted as part of a hosting program form or transmitted transparently and independently from a hosting application for, or uploaded to a server as coordinates, for example, in an ASCII delimited character string as x/y coordinates or as line data comprising begin and end points of each straight line or angle degree and line length, or as a graphic image file. A server may use the coordinates to create a graphic image file, and may store the graphic image file or signature data for future display or editing.

Once the signature has been recorded and submitted at the client side, a "Thank You" message could be delivered to the client. For example, the client could be redirected to a web page, a "pop-up" or dialogue box could be displayed, etc. This message could be generated by server-side script or called from the client.

Signatures can be validated by comparing the generated signature or signature data against a stored signature or stored signature data. The stored signature or stored signature data could be identified by using additional data, such as email address or name, or a unique ID such as a client ID or session ID, which could be embedded as a parameter in a hosting application form (e.g., HTML or XAML) that loads the signature pad application or typed directly into the hosting application form or signature pad form field(s) so that both the hosting application and the signature pad application send the same ID to the server. This ID could be used by the merchant or other entity requesting the signature, to access the stored generated signature. In some embodiments, signature validation may be achieved by additionally or alternatively generating a checksum of the generated signature or signature data, storing the checksum, and using the stored checksum to validate the generated signature or signature data. Further, in some embodiments, signature validation may be achieved by additionally or alternatively using a one-way hash, such as, for example, the MD4 Message-Digest Algorithm, the MD5 Message-Digest Algorithm, or Secure Hash Algorithm.

The client and/or the merchant could receive the Thank You via an email generated by the signature pad or by a server script. Such an email could contain links(s) to and/or attachment(s), such as an HTML, PDF, or WORD document, containing information related to the signature, such as a graphical image of the signature, additional signature data, a receipt, the signed document, verification that the signature was recorded properly or matches a signature on file, etc.

Figure 4:
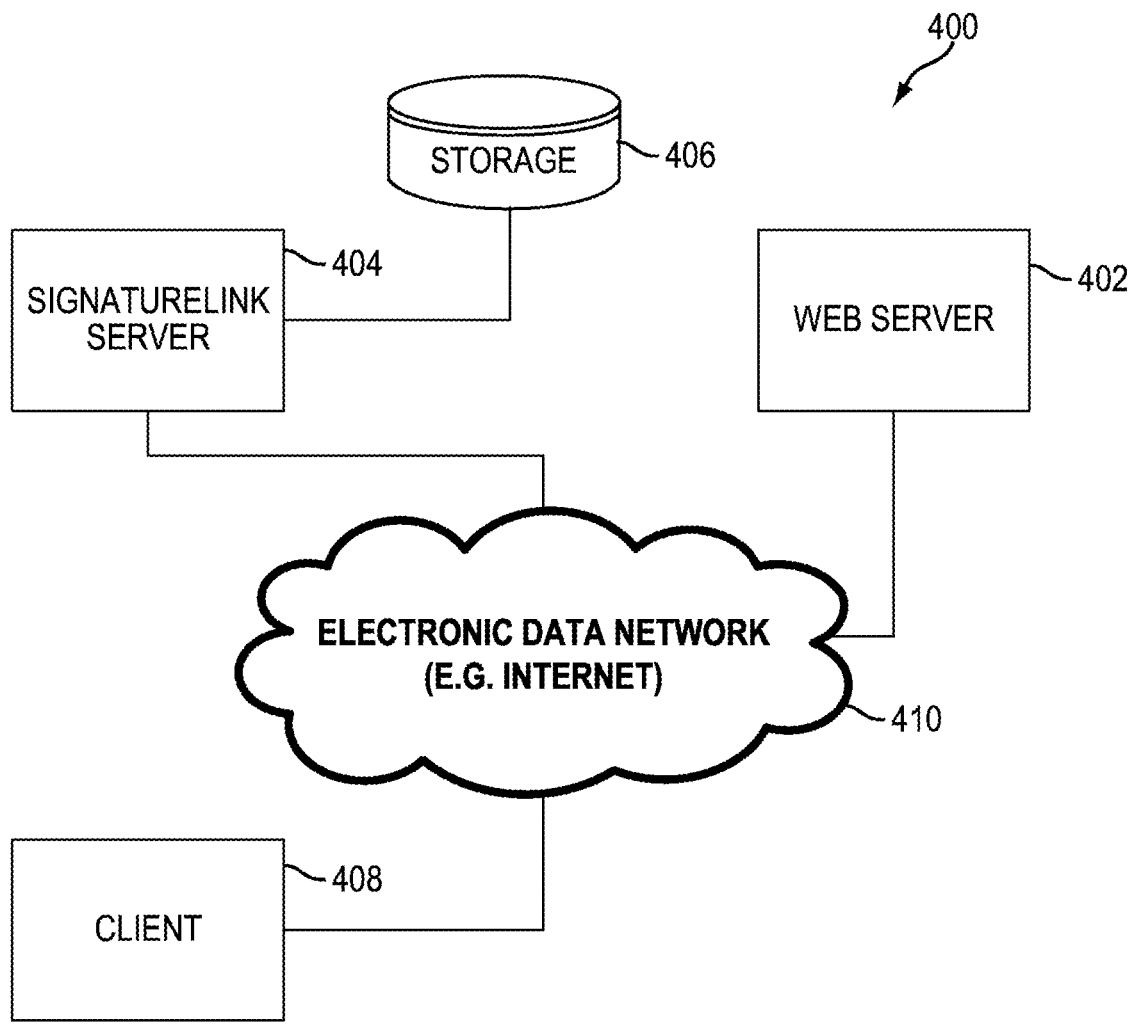
FIG. 4 is a block diagram of a system for capturing a real-time online electronic, biometrically accurate signature according to an embodiment of the present invention.

FIG. 4 is a block diagram of a system for capturing online electronic signatures according to an embodiment of the present invention.

As shown, the system 400 could include a web server 402 (e.g., "merchant" server), a signature link server 404 coupled with a storage device 406, and a client interface 408, each coupled with or otherwise in communication with an electronic data network 410, such as the Internet.

The web server 402 may be configured to provide online content such as HTML pages, java programs, streaming broadcast data or multimedia services, etc. Such content maybe accessed and displayed, played, executed, etc. by client 408, such as via a web browser such as INTERNET EXPLORER. In one non-limiting embodiment, the content may be entered manually (e.g., from a merchant located at the premises of the client 408) instead of being received from a remote source. Within the content to be displayed may be a call, such as an embedded object request, which causes the client 408 to access the signature link server 404 and download a program element configured to display a signature block, such as described above with respect to FIGS. 1-3. Alternatively, in some embodiments, instead of being downloaded from the signature link server 404, the program element may be pre-installed on the client computer interface 408 (e.g., by a manufacturer of the client 408), installed locally (e.g., from a storage medium at the premises of the client 408 or connected to the client 408 over a local network), or downloaded from the web server 402. Further, in embodiments, where the program element is not pre-installed on the client 408, the program mode may be downloaded and/or installed just before execution or at any time before. That is, in some embodiments, download and/or installation of the program element may follow and/or be caused by access, display, and/or execution of the content (e.g., via a link or command embedded in the content, which may be from the web server 402), but, this is not required. In other embodiments, the program element may be downloaded and/or installed before and/or independent of access, display, and/or execution of the content. In some embodiments, downloaded or pre-installed versions of the signature program may be a plugin or native application.

The client 408 executes the program, such as within a web browser, and the user may enter a signature, such as via a peripheral device, such as a computer mouse. The client displays and captures the biometric signature of the user as described above. The signature data may be stored locally or transmitted directly to the signature link server 404, which can be configured to generate a graphical image of the signature. Otherwise, a graphical image of the signature could be generated locally and transmitted to the signature link server 404.

The signature link server 404 can store signature data (e.g., coordinate, pixel or line data) or signature images in a storage device 406, which may be part of the server or a separate data storage device. However, in some embodiments, storage of the signature data may be optional. As described above, additional data can be stored with the signature image (e.g., in the image itself, in a text file on the file system, etc.) or in a database. For example, additional form data may be transmitted to the signature link server 404 along with the signature data and/or a graphical image. The additional form data could be stored in the storage device 406, such as in a database, and linked to the graphical image of the signature or to the signature data.

Preferably, the signature data and/or image files can be made accessible via the electronic data network 410. Alternatively, signature data, additional data, and/or graphical images could be transmitted directly to the web server 402 from the client 408. In some embodiments, storage of the signature data and/or image files received by the signature link server 404 is optional. In one non-limiting embodiment, signature data and/or an image file received by the signature link server 404 are not stored at the signature link server 404. For example, the signature link server 404 may save nothing or just save a receipt of the transaction and/or transmit the signature data and/or image file to the web server 402.

The generated image can be a signature only, or may include other elements, such as text element related to contract terms or other information associated with an online transaction. For example, as shown in FIG. 5, several clauses are combined with the signature to form an online electronic signed contract.

After the signature and optional data is received by the server, the server may save and/or display the receipt of the transaction or the agreement text for which the signature was required. For instance, when making a purchase online, the resulting "Thank You" page may DISPLAY the details of your order along with the signature image embedded in the HTML as a signed receipt for the customer to print for future reference. This data may be optionally re-displayed with a dynamic webpage that gathers the data from storage and displays it preferably as HTML along with the embedded signature image. This data could optionally be stored as a static HTML webpage on the server for future reference, especially for the merchant to print off in case of a credit card chargeback dispute.

As another example, when submitting a signature in order to agree to an agreement or Terms & Conditions, the next page could display the agreement or Terms & Conditions with the signature image embedded at the bottom of the webpage. In other words, the FIG. 5 "Thank You" page could store the agreed-upon text and/or accompanied data within the signature graphic image file itself or as text on the webpage along with the signature graphic image file.

Since the signature capturing process is independent, it may be necessary to interact with a corresponding process. For example, consider the case where an online merchant desires that a signature be recorded in connection with online purchases made from its website. In this case, client 408 downloads an HTML page from merchant server 402 in order to purchase merchandise online. At some point in the purchase process, a signature will be required. The merchant HTML page can call the signature program, which can be downloaded from the signature server 404 and then executed in a web browser of client 408. As noted above, in some embodiments, instead of being downloaded from the signature server 404, the signature program may be pre-installed on the client 408, installed locally, or downloaded from the merchant server 402. For example, when payment information is being entered, before submission of the information, the signature may be recorded. Accordingly, client 408 displays and captures the biometric signature of the user as described above. The signature data may be stored locally or transmitted directly to the signature link server 404, which can be configured to generate a graphical image of the signature. Otherwise, a graphical image of the signature could be generated locally and transmitted to the signature link server 404.

Now, before the payment information is submitted to the merchant or third party system to consummate an online transaction, it may be desired that the signature be confirmed or even validated. In this case, the merchant HTML page can be prevented from being submitted until the signature is confirmed or validated by the signature server 404. For example, a required browser cookie or hidden field in an HTML page might only be populated when the "Thank You" message is generated by signature server 404. This way, no online transaction can occur without a confirmed biometric signature being recorded. The hosting application form with the required field or browser cookie may optionally be submitted to the server 402 (e.g., a merchant web server), which checks to make sure that the required fields have been set or filled, and may optionally display an error message or the received data and/or signature as a receipt. The signature may be displayed in the "Thank You" page as an embedded HTML IMG tag linked to the URL of the signature, which may reside on signature server 104 or be retrieved to the server 402. The value of the required field or the unique ID may be used in the image URL/file naming convention, so the server 402 knows the URL to the signature image file.

In order for the signature image to be retrieved securely from the server 404, either by the client 408 or server 402, the receiving party may be authenticated. Such authentication could include, but is not limited to, (1) checking to see if the retrieval request is from someone logged in to the server 404 with the appropriate account; (2) checking to see if the retrieval request is from the same IP address as the original signer within a limited period of time; (3) checking to see if the retrieval request is from a previously designated IP address, such as of a merchant, as configured by the server 404; or (4) checking to see if the retrieval request is from someone using the same session or browser cookie as the original signer within a limited period. HTTPS and/or SSL secure certificates, or the like, may be used when transmitting data between computers. The servers 404 and 402 may be the same server in some embodiments. Further, when the signature or data file are stored, they can be stored encrypted by standard encryption techniques. When, the signature or file is retrieved, standard decryption techniques can be used to decrypt the signature or file before it is sent to the retriever.

Figure 6:
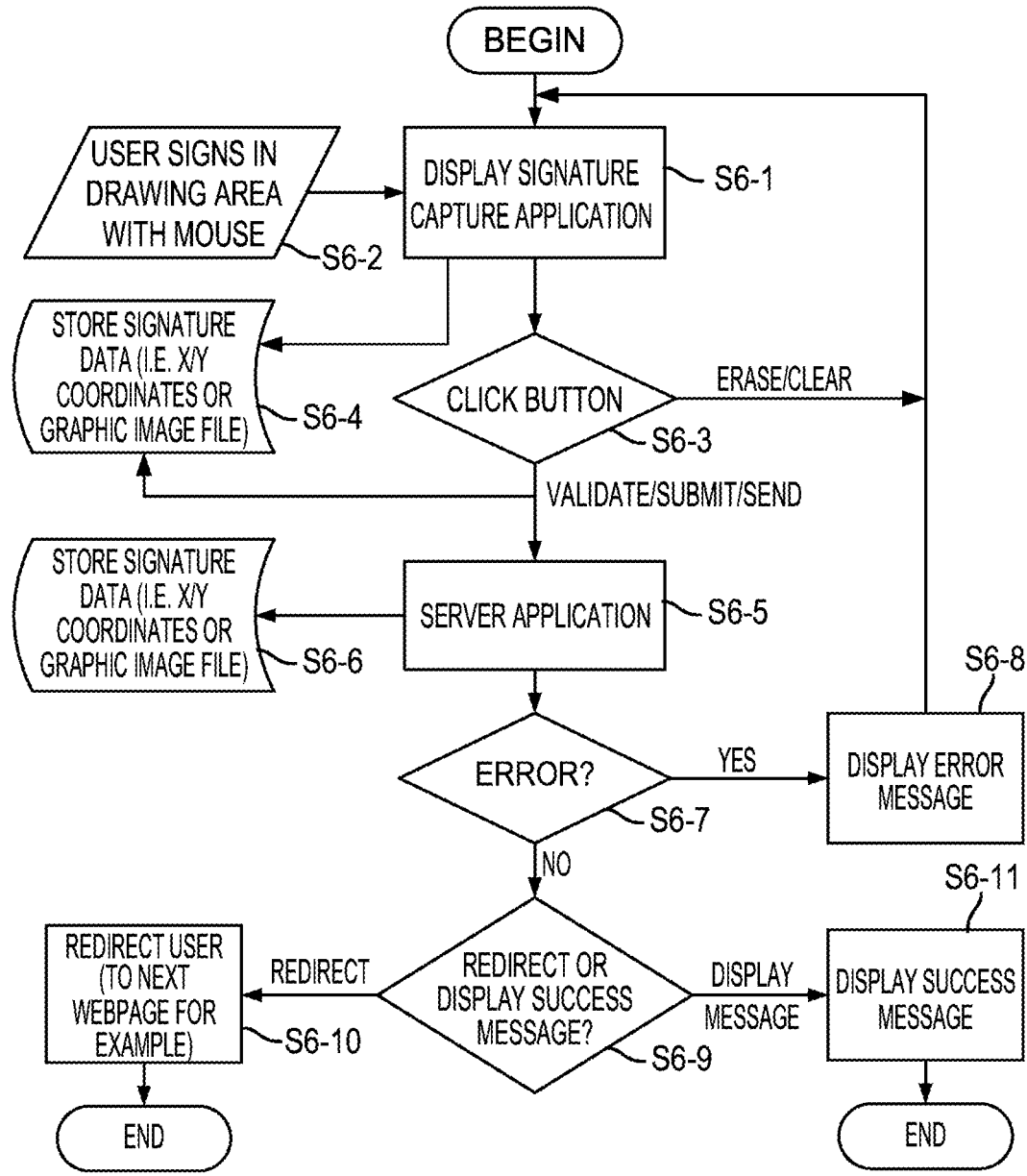
FIG. 6 is a flow chart of a real-time online electronic, biometrically accurate signature capture process according to an embodiment of the present invention.

FIG. 6 is a flowchart of a method for capturing an online electronic signature. The method may be implemented with systems and programs as described above with reference to FIGS. 1-5.

At step S6-1, when a user accesses a program, web page, etc. which is configured to use an online signature according to an embodiment of the present invention, a signature display block or drawing pad is displayed on the user computer separate from or in connection with the corresponding program, web page, etc. The signature display block or drawing pad is preferably configured to perform at least the signature capture and display process.

At S6-2 the user signs in the drawing via a computer peripheral device, such as a mouse. If the drawing is acceptable to the user, he or she may submit the drawing via a submit function or button (S6-3). At S6-4, stored captured data is sent to a server for storing and/or generation of the graphical signature. As described above, additional information may be submitted with the coordinate data or with the signature image and therefore, the signature capture process may be coordinated with other data entry.

A clear function or button can also be provided. If at step S6-3 the clear function is executed, coordinate data is erased and processing returns to step S6-1.

Data may also be sent directly to a server application upon submission (S6-5). A server application can store the signature coordinate data or generate an appropriate graphical image of the signature for display and/or storage, which may also include other items such as text or data (S6-6). The accompanied data may be stored separately from the graphic image file, such as in a database and/or in a text file and/or in a static HTML "receipt" webpage of the transaction.

If there is a problem (S6-7) with the signature or data related thereto, an error message can be displayed (S6-8) and processing can be returned to step S6-1. Data may be erased or left in place for correction. Otherwise, a final step can be performed (S6-9), such as redirecting the user to another web page, program, etc. (S6-10) or displaying a success message indicating that the transaction is complete and/or the signature has been successfully captured and generated (S6-11). However, in some embodiments, the signature program may not update the client (e.g., by performing step S6-9 or S6-10) in the case of successful signature capture and storage.

According to another embodiment of the present invention, the signature capture program could be included within a hosting application as standard functionality or as a plug-in. Web pages could invoke the signature capture feature of the hosting application through standard or browser-specific HTML or XML.

Figure 8:
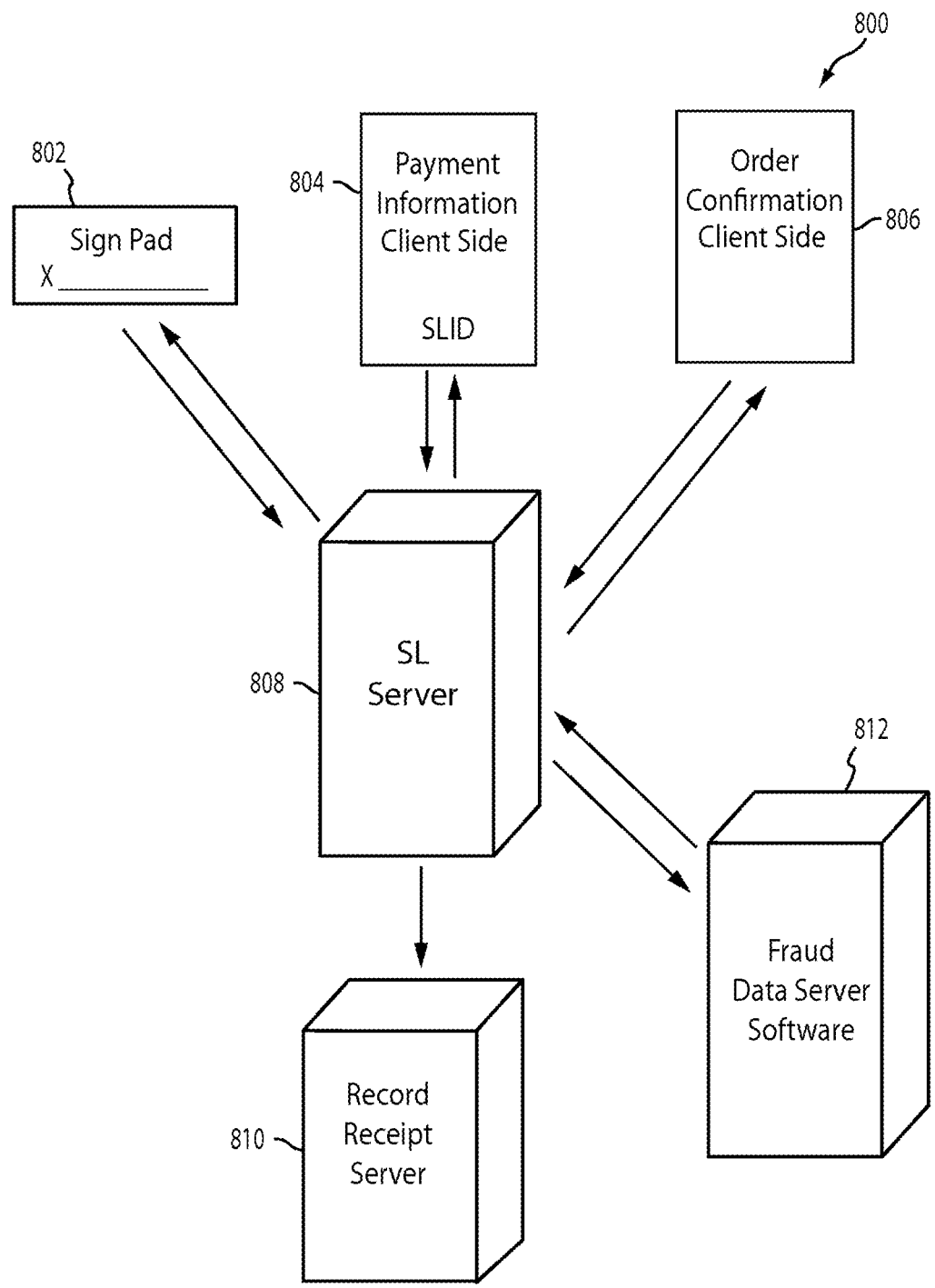
FIG. 8 is a block diagram of a system for capturing client-side data according to an embodiment of the present invention.

FIG. 8 is a block diagram of a system for capturing both a client-side signature and client-side data according to aspects of the present invention. System 800 may include a number of servers that are coupled with an electronic data network, such as the Internet and world wide web, for communicating content, data, software program code and modules, etc. for the purpose of recording an online transaction. Client side programs may include a signature pad 802, which can be implemented as already described herein. One or more web pages may be implemented for the purpose of receiving customer information associated with the transaction. For example, payment information can be received through a form or HTML page 804. An order confirmation form 806 is also utilized with the online transaction. The modules or forms 802-806 can communicate with a server 808, which is coupled with one or more additional servers that perform features according to embodiments of the present invention, such as, for example, record receipt generation and/or storage, fraud protection data storage and/or services 812, etc. Online commerce can be transacted through system 800 as already described above and as further described below.

In some embodiments, signature pad 102 and/or signature link server 404 may normalize the captured signature data so as to be relatively consistent irrespective of the hardware utilized in its capture. Different devices will capture signature data differently (e.g., at different densities and rates depending, for example, on resolution and/or size of the signing surface, processor operating speed, mouse and/or signature pad sampling rate, the available RAM memory and the like), and normalization reduces the effects of differences in the captured signature data.

Figure 9:
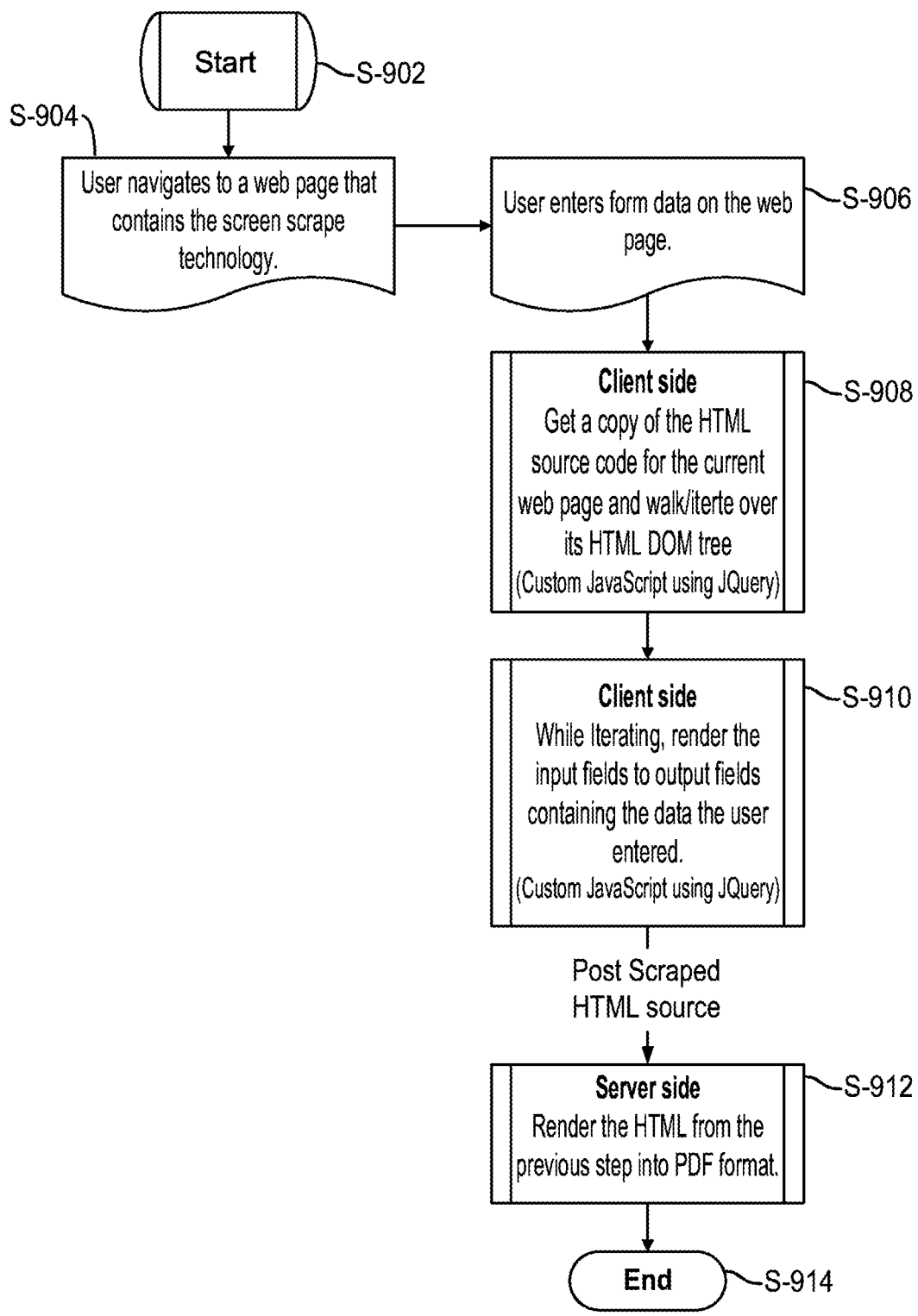
FIG. 9 is a flow chart that illustrates steps of a method for capturing client-side data according to an embodiment of the present invention.

FIG. 9 illustrates steps of a method for capturing client-side data according to aspects of the present invention. The method starts at step S-902 and proceeds to step S-904. A user (customer) navigates to a web page, such as with a browser, that contains a screen scrape module or program code according to embodiments of the present invention. At step S-906, the customer then enters form data onto the web page. As already described herein, the form data may include information about the transaction, payment information, information about the customer, etc. At step S-908, a copy of the HTML source code for the current web page is obtained and its HTML DOM tree is iteratively walked by the screen scape program. For example, a custom java script using jQuery could be written to walk the DOM.

At step S-910, during the iterative walking process, each of the input fields in the HTML can be replaced with identical fields containing the actual data that the user entered into the form. The HTML source including the client side data can then be transmitted to a remote server side program which, at S-912, can render the HTML including the client side data as a file having a more appropriate file format for permanent record keeping. For example, as described below, a program can be provided that will render HTML into a pdf format. Processing ends at step S-914.

In a typical configuration, the signature pad is integrated into client-side enterprise platform or shopping cart. When performing an online transaction, a customer signs the signature pad, then clicks a submit or proceed button. The signature pad can be configured to communicate with the server 808, which communicates with the client-side screen scrape program that performs the DOM scan. The scanned HTML code is captured (e.g., by the server 808) and converted to an un-editable record including the actual data that was present on the client-side machine at the exact time of the transaction acceptance and execution. Other data such as terms and condition, geo location, device ID, etc. can also be captured and combined with the captured html data to create a permanent, un-editable record of the critical aspects of the electronic transaction. This record could include the signature so as to appear as a signed contract. The permanent record can be subsequently stored at a secure location, where it can be made available for view and retrieval for the purposes of transaction verification. Accordingly, an indelible image of what the customer sees when they enter the transaction is captured.

Figure 10A:
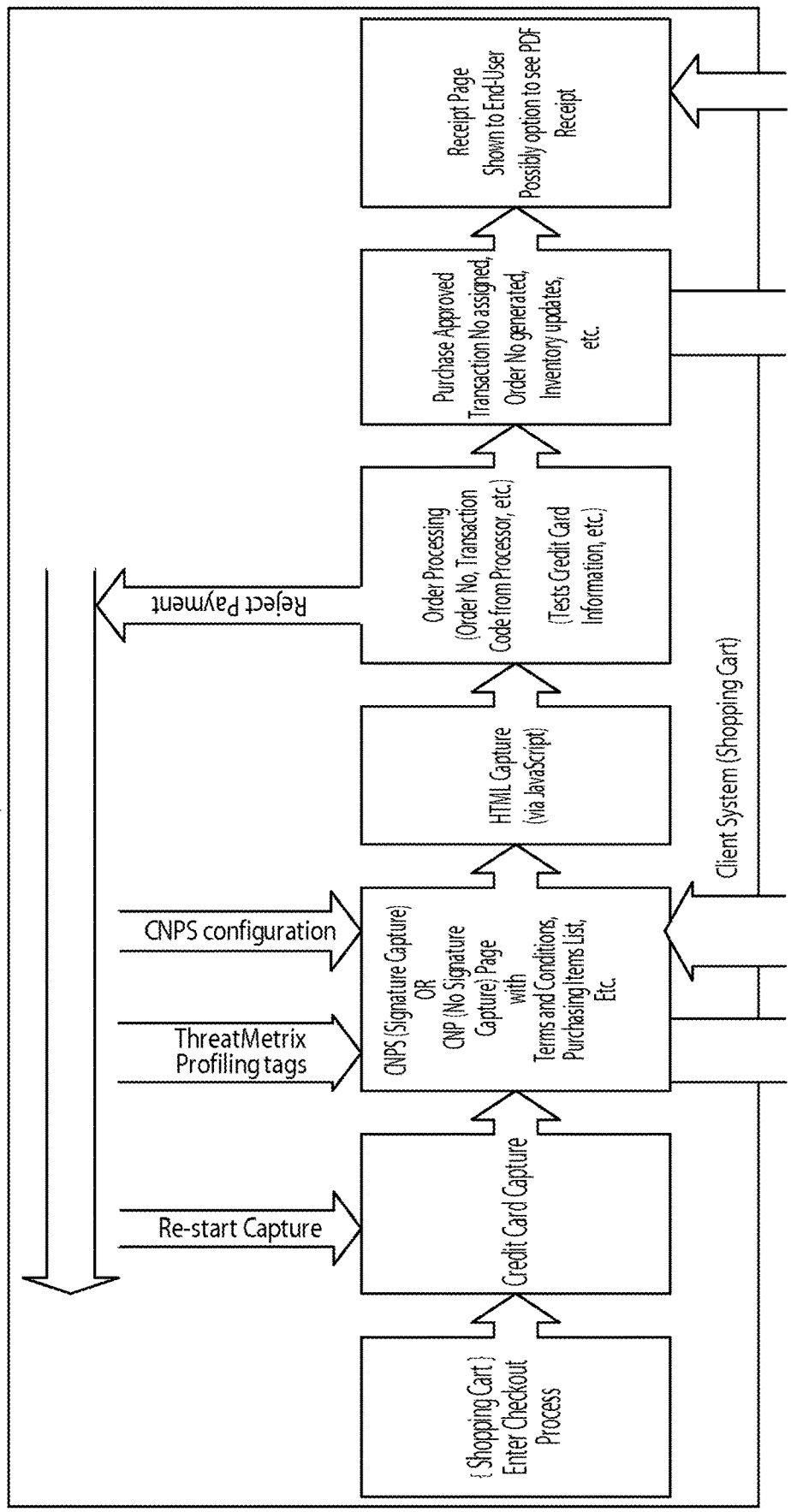
FIGS. 10A and 10B are data process flow diagrams of an online transaction according to an embodiment of the present invention.
Figure 10B:
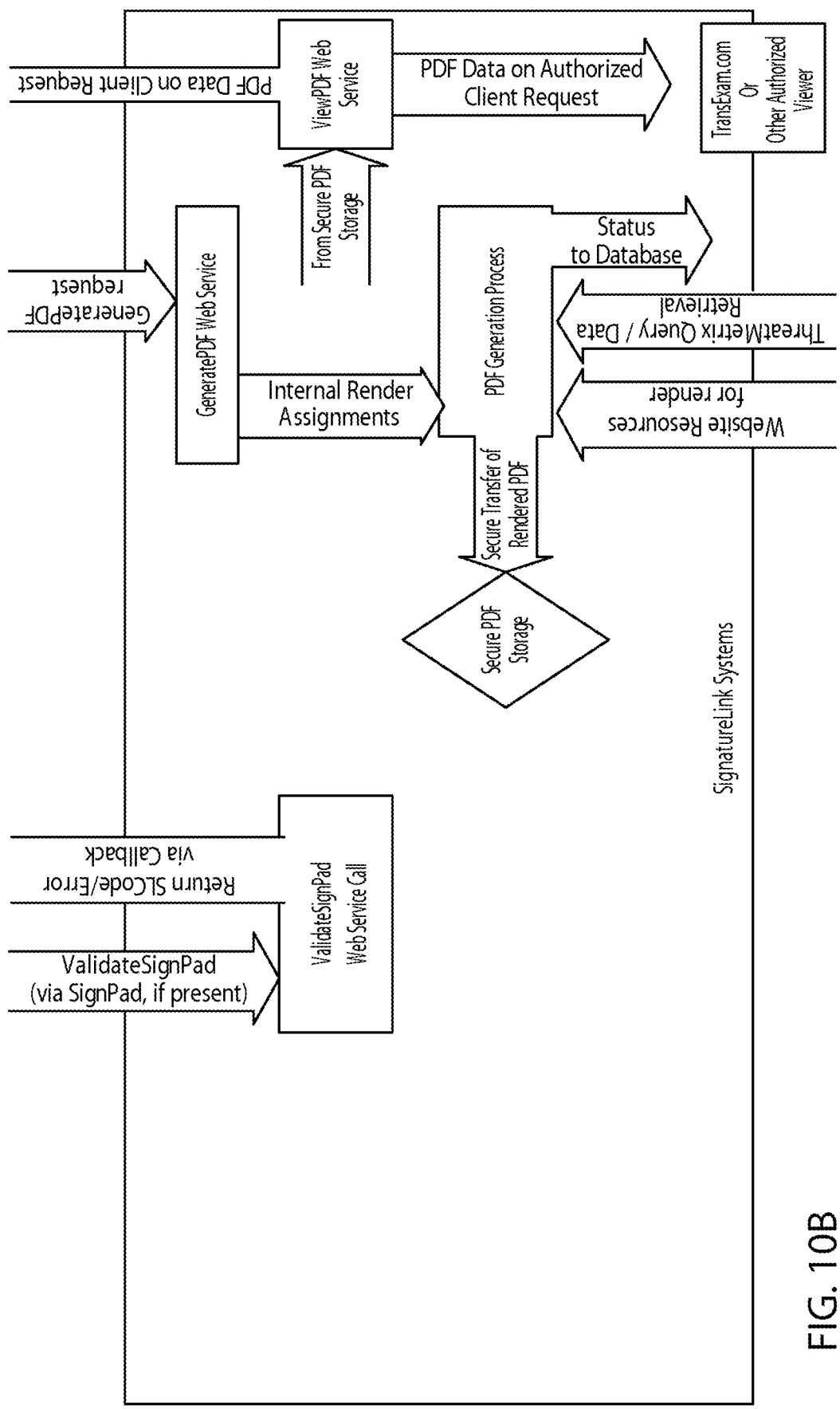

FIGS. 10A and 10B illustrate primary CNPS calls and returns according to aspects of the present invention. FIGS. 10A and 10B illustrate logical and data process flow according to aspects of the present invention. As illustrated, during the check-out process, credit card capture can be initiated which includes capture and verification of an online signature through a signature pad as described herein, subsequently followed by an html capture performed by a screen scape program as described herein. The online order processing can be performed and if payment is rejected, the checkout process can be restarted at the credit card capture point. If the order is not rejected, then the permanent record can be generated as described herein and securely stored. Further, a receipt page can be transmitted to the client containing the transaction information and optionally pdf copy of the signed receipt.

Figure 11A:
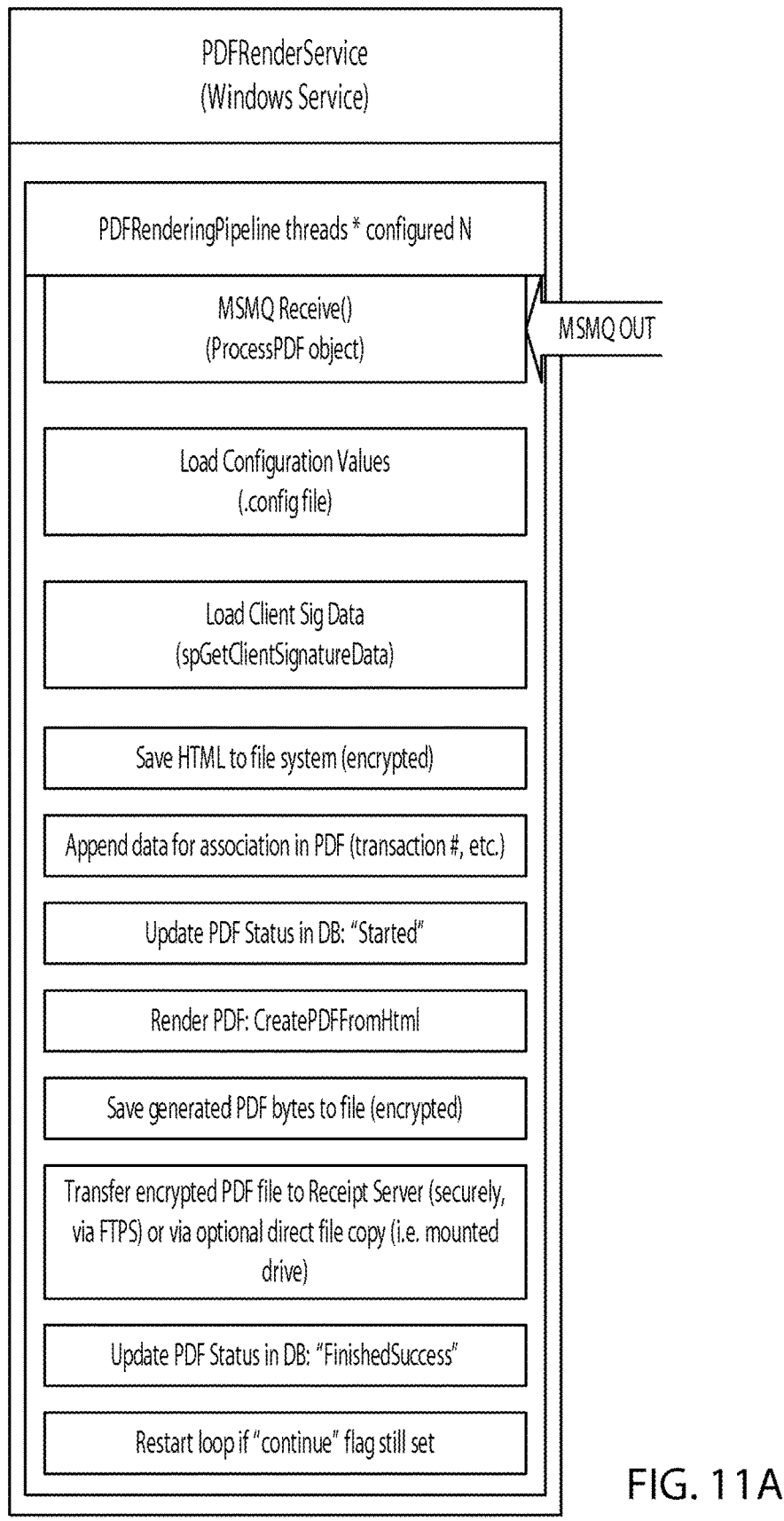
FIGS. 11A and 11B are data process flow diagrams for generation of a permanent record associated with an online transaction according to an embodiment of the present invention.
Figure 11B:
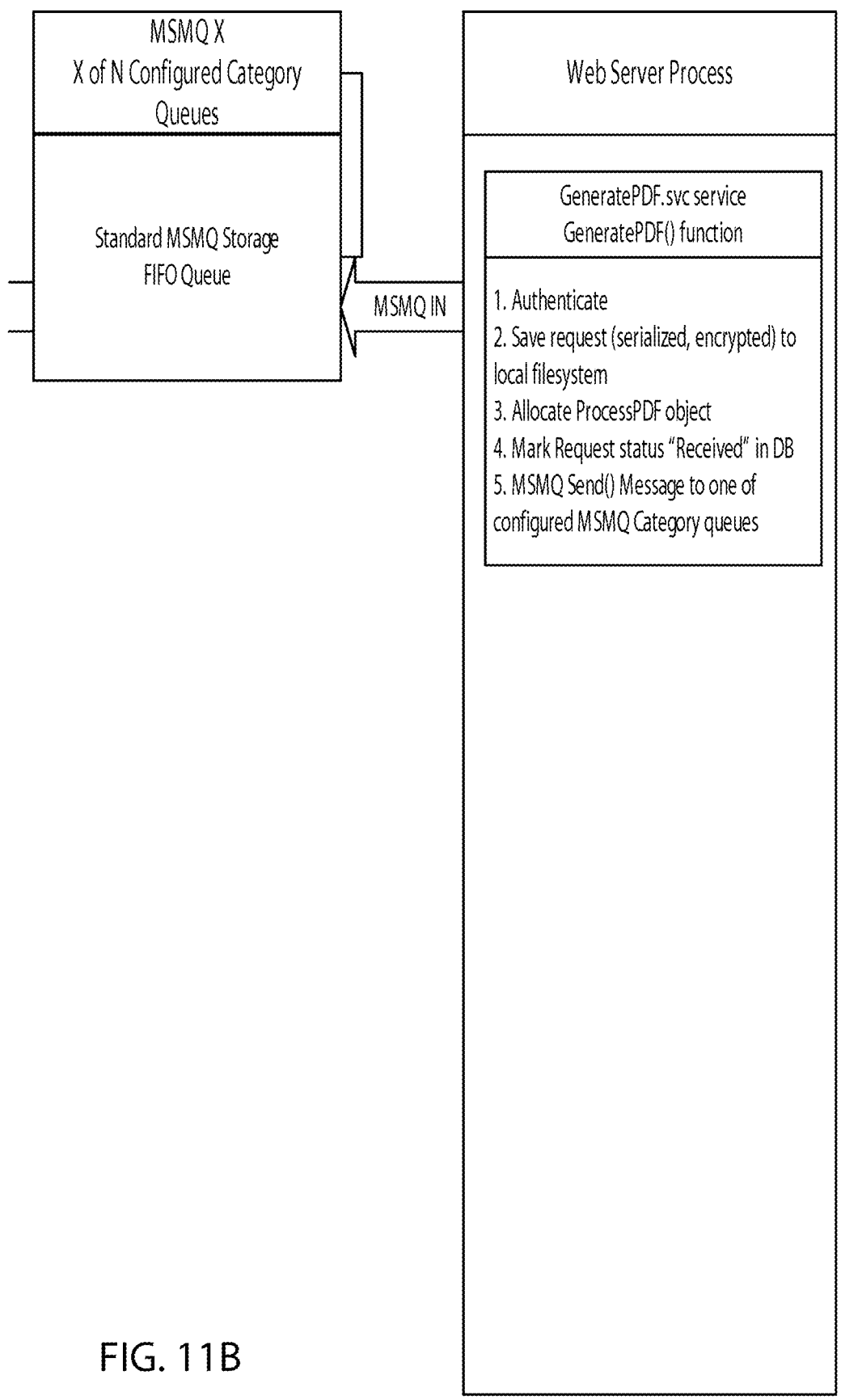

FIGS. 11A and 11B illustrate processing data flows for generating and storing a permanent record according to aspects of the present invention.

The PDF Rending process is preferably a standalone component within the CNPS process. The PDF Rending process can be made up of three components: a generate PDF web service, a queue, and a PDF render job. As shown in the example of FIGS. 11A and 11B, the process can be started by a client calling the generate PDF web service; the data can be validated, and the transaction inserted into the queue for processing (PDF generation). The queue is preferably first-in first-out (FIFO) and will hold the transactions.

The PDF render job can be a recurring, scheduled process that picks up pending transactions from the queue to create the PDF. The Render PDF job may use the data from the web service call (now in the queue and DB) along with client specific settings within the DB to create the final PDF. As shown, the job goes through a series of steps, including updating the transaction status in DB at each completion point, to generate the final PDF. Once completed the final encrypted PDF is sent to the Receipt Server; once there the PDF is now accessible to the client for view or download. The PDF as generated can be read only, pass word protected or otherwise generated to protect the content thereof.

Figure 12A:
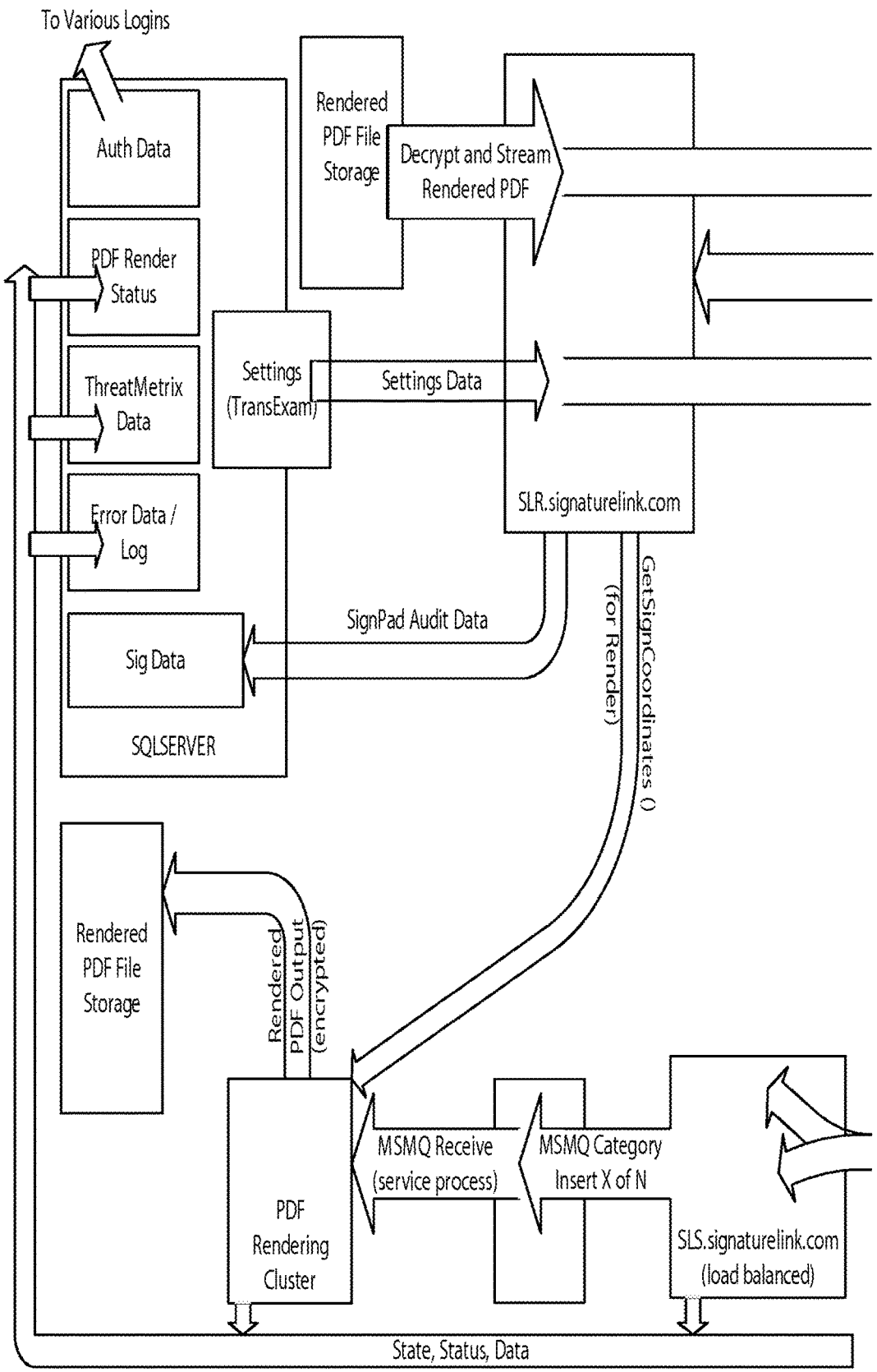
FIGS. 12A and 12B are data process flow diagrams of a rendering process for generation of a permanent record associated with an online transaction according to an embodiment of the present invention.
Figure 12B:
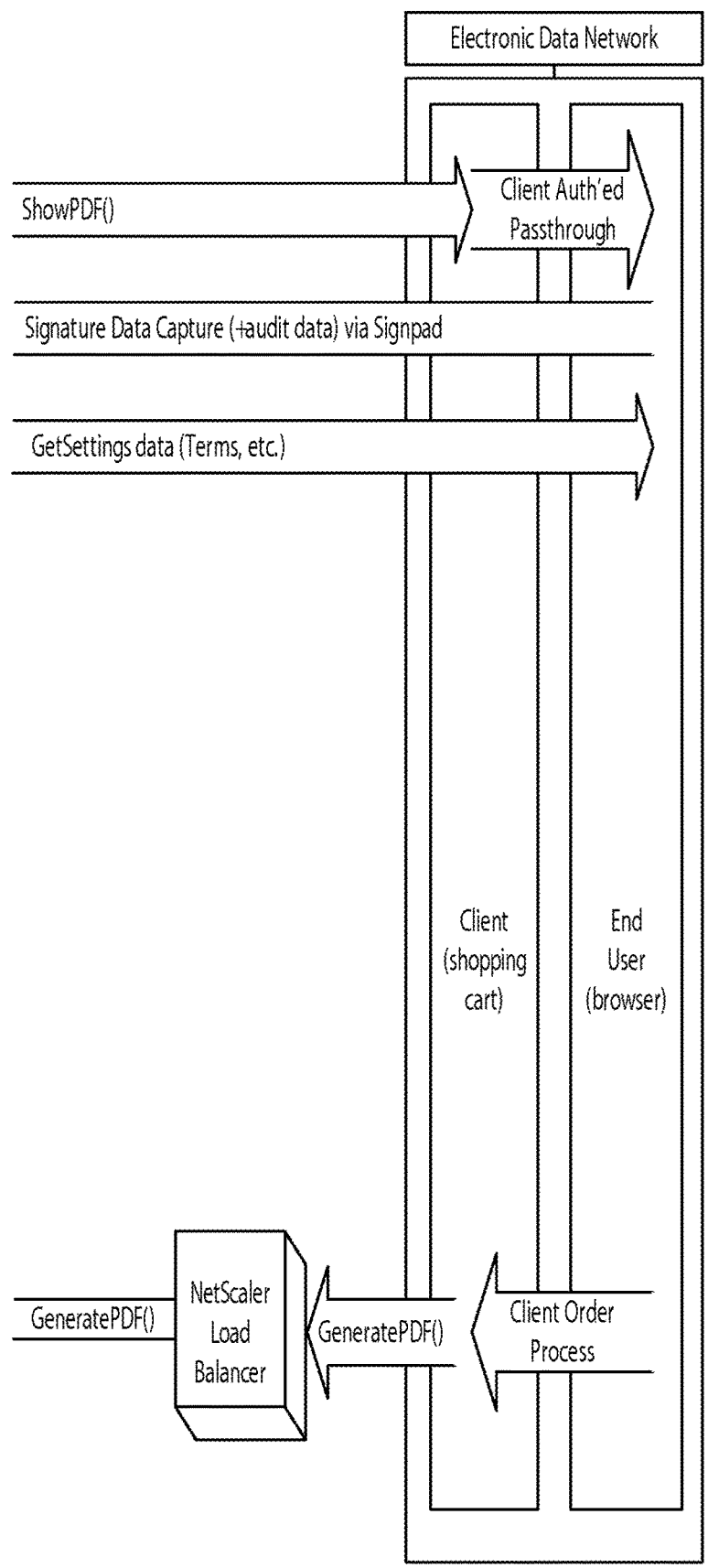

FIGS. 12A and 12B illustrate processing data flows for generating and storing a permanent record according to aspects of the present invention. The CNPS Server Design and process is preferably architected to be a redundant, high available system with the capability to easy add servers and bandwidth to support increasing demand levels. An exemplary CNPS process starts off with a consumer in the checkout process on a merchant's web site. During the checkout process the consumer shall be presented with all the normal, industry standard checkout prompts. The CNPS process can add a few extra components to the check process: signature pad, transaction profiling, Terms and conditions, screen scrape, and PDF rending of the receipt page.

As shown, communications are between the end user's browser and the CNPS system (client side) and between the merchant's server and the CNPS system (server side). The combination of both client and server side interactions can be used to profile the transaction (end user's device, IP, and checkout data) for a fraud score, capture the end user's signature, and scrape the order confirmation page. An outcome of all the data and flows is the generation of a PDF that is an exact copy of the order confirmation, the user's signature, the terms and conditions, and overall fraud score.

The CNPS system can be constructed up of six main design areas that interact with each other, the end user, and the merchant to support the CNPS Process: CNPS web services; CNPS Admin web site; CNPS Database; CNPS client side libraries (runs on the user's browser); Signature Pad; Fraud Screening and transaction profiling.

Accordingly, according to aspects of the present invention, a novel DOM traversal method of capturing client side html and data as it is entered on the screen is provided. This method is universally applicable to any number of contemplated applications. However, according to aspects of the present invention, it is particularly applicable to capturing client-side real-time data along with or in connection with an electronic transaction. From this captured data a permanent record can be created which can be combined with other information to create a receipt and permanent record of the electronic transaction. The permanent record can include a biometric online signature. The data and the permanent record can be stored in a remote location for subsequent review and retrieval. A skilled person will readily understand that aspects of the present invention can be used individually or combined with other aspects to fulfill the requirements of a particular application.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A system for generating a record of an online transaction, said system comprising:

a computer interface module that records movement of said cursor on a computer screen and outputs the recorded data;

a signature generation module that receives said recorded data and generates a graphical image of a biometric signature based upon said recorded data;

a screen scrape module configured to create an electronic file containing information corresponding to display information on the computer screen and to transmit said electronic file to a remote server, said server being configured to generate an un-editable computer file containing the information corresponding to said display information;

a web page that contains a screen scrape module;

a peripheral device selected from the group consisting of a mouse, a writing pad, keyboard arrows, and a touch pad;

wherein said peripheral device captures a raw biometric signature data by generating a graphical image through movement of a cursor; and wherein said raw biometric signature data is stored as line data, comprising beginning points, and end points, line length and angle degrees.

2. The system as recited in claim 1, wherein said electronic file is HTML and data obtained from the screen scrape module that walks a Document Object Model DOM of an HTML page using a custom java script jQuery to insert data that has been input by a user into the HTML.

3. A system for generating a permanent record including:
means for extracting all content and data from a webpage, said data including data input into said webpage by a user of said webpage;
means for recording a user's movement of a cursor on a computer screen to generate a graphical image of a signature of the user; and
means for generating a permanent computer file record containing said content and data and said signature, said permanent computer file record including an image of said content with said data inserted therein.

4. The system as recited in claim 3, wherein said webpage is HTML and said permanent computer file record is a PDF.

5. A computer implemented method for capturing an online electronic, biometric signature for an online transaction, said method comprising steps of:
in connection with an online electronic transaction, at a client computer interface configured to display content or said online electronic transaction, executing a signature program configured to display a signature block on said client computer interface, to receive raw biometric signature data input from said client computer interface, and to capture biometric signature data and associate said biometric signature data with said online electronic transaction;
electronically transmitting said captured biometric signature data in association with said online electronic transaction to a storage facility;
after said signature data in association with said online electronic transaction is received at said storage facility, electronically transmitting to said client computer interface and to a party associated with said online electronic transaction a notification indicating that the said biometric signature data has been received; and
wherein said raw biometric signature data is stored as line data, comprising beginning points, end points, line length and angle degrees.

6. The method as recited in claim 5, wherein said signature program is identified by a link in said content for said online electronic transaction.

7. The method as recited in claim 5, wherein said signature program is preinstalled on said client computer interface.

8. The method as recited in claim 5, wherein said signature program is downloaded to said client computer interface independent of said content for said online electronic transaction.

9. The method as received in claim 5, wherein said content for said online electronic transaction is received from a web server application associated with a first party and said storage facility is associated with a second party separate from said first party.

10. The method as recited in claim 5, further comprising a step of generating an electronic representation of the signature from said biometric signature data.

11. The method as recited in claim 10, wherein said electronic representation of the signature is an image.

12. The method as recited in claim 5, wherein said signature program is executed with a plug-in.

13. The method as recited in claim 5, wherein said content is web content.

14. The method as recited in claim 5, wherein said signature data is HTML and data.

15. A method as recited in claim 5, further comprising the steps of:
extracting all content and data from a webpage, said data including data input into said webpage by a user of said webpage; and
generating a permanent computer file record containing said content and data, said permanent computer file record including an image of said content with said data inserted therein.

16. The method as recited in claim 15, wherein said webpage is HTML and said permanent computer file record is a PDF.

* * * * *